US009495195B2

(12) United States Patent
Terayama et al.

(10) Patent No.: US 9,495,195 B2
(45) Date of Patent: Nov. 15, 2016

(54) RESOURCE MIGRATION BETWEEN VIRTUAL CONTAINERS BASED ON UTILIZATION RATE AND PERFORMANCE DEGRADATION

(71) Applicant: HITACHI, LTD., Tokyo (JP)

(72) Inventors: Atsumi Terayama, Tokyo (JP); Toru Tanaka, Tokyo (JP); Toshio Otani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/770,081

(22) PCT Filed: Oct. 4, 2013

(86) PCT No.: PCT/JP2013/077063
§ 371 (c)(1),
(2) Date: Aug. 24, 2015

(87) PCT Pub. No.: WO2015/049789
PCT Pub. Date: Apr. 9, 2015

(65) Prior Publication Data
US 2016/0004551 A1    Jan. 7, 2016

(51) Int. Cl.
*G06F 9/455*    (2006.01)
*G06F 9/50*    (2006.01)
(Continued)

(52) U.S. Cl.
CPC ......... *G06F 9/45558* (2013.01); *G06F 9/5011* (2013.01); *G06F 9/5077* (2013.01); *G06F 11/30* (2013.01); *G06F 11/34* (2013.01); *G06F 2009/4557* (2013.01); *G06F 2009/45595* (2013.01)

(58) Field of Classification Search
CPC ................ G06F 9/45558; G06F 9/5011; G06F 9/5077; G06F 2009/4557; G06F 2009/45595; G06F 11/30; G06F 11/34
See application file for complete search history.

(56) References Cited

U.S. PATENT DOCUMENTS 7,752,623 B1 *  7/2010  Crawford, Jr. .......... G06F 9/505
                                                        718/1
7,765,552 B2 *  7/2010  Miller .................. G06F 9/5072
                                                       709/224
(Continued)

FOREIGN PATENT DOCUMENTS

JP          2010-282420 A     12/2010

*Primary Examiner* — Benjamin Wu
(74) *Attorney, Agent, or Firm* — Volpe and Koenig, P.C.

(57) ABSTRACT

The integrated resource management unit 202 manages some of the resources 311*a*, 311*b*, 311*c* and prepares a plurality of containers 310 provided as virtual resources, with respect to the application programs. In response to a predetermined request that is issued with respect to a tenant 300*a* or 300*b* that is configured to divide a resource to be used, the integrated resource management unit provides a request-source tenant with a container selected from among the plurality of containers. In the container that is provided to the request-source tenant by the integrated resource management unit, a resource, which is allocated beforehand to an application program designated by the predetermined request, is occasionally configured to have usage lower than a designated usage.

8 Claims, 12 Drawing Sheets

(51) Int. Cl.
*G06F 11/30* (2006.01)
*G06F 11/34* (2006.01)

(56) References Cited

U.S. PATENT DOCUMENTS

| | | | | |
|---|---|---|---|---|
| 8,146,091 | B2* | 3/2012 | Johnson | G06F 9/5077 718/104 |
| 8,560,671 | B1* | 10/2013 | Yahalom | H04L 67/1097 709/224 |
| 9,280,392 | B1* | 3/2016 | Boss | G06F 9/5011 |
| 2003/0037092 | A1* | 2/2003 | McCarthy | G06F 9/5061 718/104 |
| 2004/0221290 | A1* | 11/2004 | Casey | G06F 9/50 718/104 |
| 2005/0039183 | A1* | 2/2005 | Romero | G06F 9/5061 718/100 |
| 2005/0198102 | A1* | 9/2005 | Hahn | G06F 9/44505 709/200 |
| 2006/0136928 | A1* | 6/2006 | Crawford | G06F 9/5077 718/105 |
| 2006/0195715 | A1* | 8/2006 | Herington | G06F 9/5077 714/4.2 |
| 2006/0195827 | A1* | 8/2006 | Rhine | G06F 9/5088 717/140 |
| 2007/0150894 | A1* | 6/2007 | Barsness | G06F 9/45533 718/100 |
| 2010/0312893 | A1 | 12/2010 | Watanabe et al. | |
| 2012/0023492 | A1* | 1/2012 | Govindan | G06F 9/5083 718/1 |
| 2012/0089980 | A1* | 4/2012 | Sharp | G06F 9/45558 718/1 |
| 2012/0174097 | A1* | 7/2012 | Levin | G06F 9/5077 718/1 |
| 2012/0246638 | A1* | 9/2012 | He | G06F 9/45558 718/1 |
| 2012/0254445 | A1 | 10/2012 | Kawamoto et al. | |
| 2013/0159997 | A1* | 6/2013 | Cawlfield | G06F 9/45558 718/1 |
| 2013/0239111 | A1* | 9/2013 | Bingham | G06F 9/45533 718/1 |
| 2014/0040895 | A1* | 1/2014 | Peng | G06F 9/45533 718/1 |
| 2014/0082612 | A1* | 3/2014 | Breitgand | G06F 9/45533 718/1 |
| 2014/0258446 | A1* | 9/2014 | Bursell | G06F 15/177 709/217 |
| 2015/0143364 | A1* | 5/2015 | Anderson | G06F 9/5088 718/1 |
| 2015/0295792 | A1* | 10/2015 | Cropper | H04L 67/10 709/226 |
| 2015/0378786 | A1* | 12/2015 | Suparna | G06F 9/5011 718/104 |

* cited by examiner

FIG.5

Instance management table 211

| Instance 211a | Owner 211b | Resource pool 211c | Container 211d | Resource configuration 211e | Network policy 211f | Grade 211g | Point 211h | Usage period 211j | App management server 211k |
|---|---|---|---|---|---|---|---|---|---|
| IST-A0-0001 | User# 01-023 | RP-A2 | CNT-A022 | CPU:3.0GHz x8 Memory:18GB Disk:500GB | NWP-001 | Gold | 650pt | 30日 | DB3 |
| IST-A0-0003 | User# 01-023 | RP-A2 | CNT-A022 | CPU:3.0GHz x2 Memory:2GB Disk:64GB | NWP-001 | Bronze | 200pt | 90日 | — |
| IST-A0-0004 | User# 01-008 | RP-A2 | CNT-A021 | CPU:2.1GHz x4 Memory:12GB Disk:120GB | NWP-008 | Silver | 400pt | 60日 | ERP |
| IST-A0-0006 | User# 01-023 | RP-CB | CNT-E1B0 | CPU:3.0GHz x8 Memory:32GB Disk:640GB | NWP-008 | Platinum | 750pt | 30日 | DB3 |
| IST-A0-B201 | User# 01-010 | RP-A2 | CNT-A022 | CPU:2.8GHz x8 Memory:18GB Disk:480GB | NWP-001 | Gold | 500pt | 30日 | — |

FIG.6

| | | 212 | | |
|---|---|---|---|---|
| 212a | Tenant ID | DC01-0001 | DC01-0002 | ... |
| 212b | User group ID | 0223-DE40, "UserGroup-B" | 0223-D0A9, "UserGroup-A" | ... |
| 212c | Management role definition | AdminRoles#1 | AdminRoles#1 | ... |
| 212d | Resource pool ID | RP-A2, RP-CB | RP-00 | ... |
| 212e | Instance management table ID | IL-DC01-0001 | IL-DC01-0002 | ... |
| 212f | Available balance point | 8200pt | 2110pt | ... |

FIG.7

Container management table 215

| Container 215a | Access authority 215b | Application management server 215c | Server 215d | Network 215e | Instance type 215f | Storage 215g | Application restriction | Virtual Resource capacity 215h 215j | Actual Resource capacity 215k |
|---|---|---|---|---|---|---|---|---|---|
| CNT-A021 | ACL-01A9 | AppMgr-A | SVR-0011 | NW-2011 | PM | STR-0000 STR-0002 | ERP | CPU:.... Memory:.... Disk:.... | CPU:.... Memory:.... Disk:.... |
| CNT-A022 | ACL-01A9 | - | SVR-0012 SVR-0701 SVR-0702 | NW-0C50, NW-0C51, NW-0C53 | VM | STR-03C0 | - | CPU:.... Memory:.... Disk:.... | CPU:.... Memory:.... Disk:.... |
| CNT-A205 | ACL-0007 | - | SVR-8201 | NW-0020 | LPR | STR-0010 STR-03C2 | - | CPU:.... Memory:.... Disk:.... | CPU:.... Memory:.... Disk:.... |
| CNT-E1B0 | ACL-0007 | AppMgr-B | SVR-0013 SVR-8299 | NW-04A0, NW-04A1 | SMP | STR-0020 | DB3 | CPU:.... Memory:.... Disk:.... | CPU:.... Memory:.... Disk:.... |

| | | | | 207e |
|---|---|---|---|---|
| 207a | 207b | 207c | 207d | |
| Target | Resource item | Required level | Operational status | Evaluation value |
| CNT-A022 | Number of CPU cores | ≧8[Cores] | 16 | ○ |
| | Memory consumption | <60[%] | 84[%] | × |
| | IO latency | <10[msec] | 7[msec] | ○ |
| IST-A0-0006 | Number of CPU cores | ≧2[Cores] | 4 | ○ |

(b)

207(1)

| 207f | 207g |
|---|---|
| Target | Evaluation value |
| IST-28-1002 | 32[Unit] |
| IST-A0-0004 | 28[Unit] |
| CNT-A021 | 211[Unit] |
| IST-B6-3665 | 14[Unit] |

FIG.10

| | | | | 214 | | |
|---|---|---|---|---|---|---|
| | 214a | 214b | 214c | 214d | 214e | 214f |
| | Container ID | Performance index | Actual measurement value | Correction coefficient | Correction value | Influence determination |
| | CNT-A021 | CPU utilization | 45[%] | 2.0 | 90 | + |
| | | Memory utilization | 80[%] | 1.0 | 80 | + |
| | | I/O latency | 25[msec] | 4.0 | 100 | − |
| | | Swap incidence | 29[%] | 10.0 | 290 | − |
| | CNT-A205 | CPU utilization | 69[%] | 0.5 | 35 | + |
| | | Network bandwidth | 160[Mbps] | 0.4 | 64 | + |
| | | IOPS | 311[I/O] | 0.2 | 62 | + |

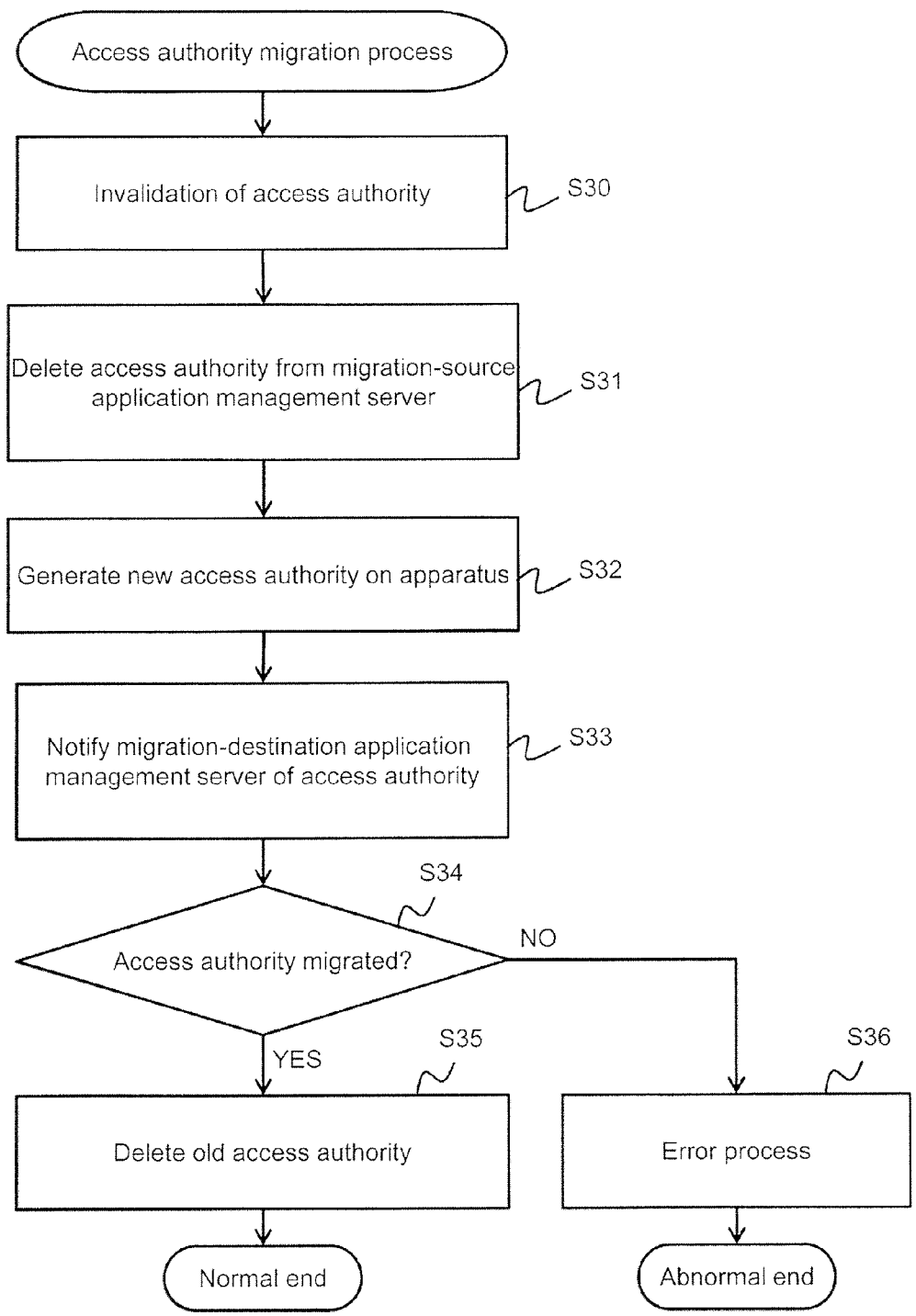

RESOURCE MIGRATION BETWEEN VIRTUAL CONTAINERS BASED ON UTILIZATION RATE AND PERFORMANCE DEGRADATION

TECHNICAL FIELD

The present invention relates to a resource management system and a resource management method.

BACKGROUND ART

An information processing system infrastructure for gathering a plurality of business systems onto a physical computer resource by using server virtualization technology has been prevalent recently in order to improve the resource utilization efficiency of the entire data center.

The virtualization technology separates the systems operated in a fixed manner on the resource, from the resource, and migrates the system between a plurality of physical computer resources in accordance with the operational status of a business application. In this manner, the unbalanced load can be smoothened dynamically.

On the other hand, controlling a network configuration in accordance with a physical arrangement of virtual machines, can isolate a system group, used by a specific user group, to a resource space called "tenant." In this manner, the security of the tenant can be ensured.

For example, PTL 1 discloses technology for promptly eliminating the imbalance between the loads of the groups in a virtual computer system in which a plurality of tenants use a plurality of physical computer resources. According to PTL 1, a plurality of virtual computers are managed on a plurality of resource groups and are migrated between the physical computer resources in accordance with the loads, to balance the loads.

CITATION LIST

Patent Literature

[PTL 1]
U.S. Patent Application Publication No. 2012/0254445

DESCRIPTION

Summary of Invention

Technical Problem

The prior art, however, is not flexible enough because it directly associates the physical computer resources with the virtual computers to manage them, leaving room for improvement in adaptability to a constantly changing environment.

The prior art is also configured to evaluate the performance load of the virtual server uniformly and does not take into consideration the performance characteristics of an application provided on the virtual server. A business application generally has requirements on the resources, but these resource requirements are not constant due to the type of the application or the scale of the configuration of the application.

Especially in a computer system called "IaaS (Infrastructure as a Service)" that adopts a self-service type usage pattern, it is up to the users of virtual servers to determine which application to construct in a certain virtual server.

However, it is difficult to predict the trends of the users' demands or the business services' demands. In this type of computer system, therefore, different types of applications exist in a single system environment.

A resource with a low utilization rate is generated depending on the ratio of the applications that exist in a single system environment. For instance, in a case where there exist an application that has a high request for a CPU (Central Processing Unit) performance and a low request for a storage performance, and an application that has a high request for a memory performance and a low request for the storage performance, the performance of the storage resource becomes redundant.

For the purpose of avoiding such inefficient usage of resources, there is considered a method for defining a dedicated resource area that is sized in accordance with the performance characteristics of an application. For example, a resource area for an application A and a resource area for an application B are prepared in a tenant. Depending on a desired application, a user generates a virtual server by using the resources of these dedicated resource areas. Although this method can efficiently be implemented in each of the dedicated resource areas, improvement in the utilization rates of the whole resources cannot be expected.

The present invention was contrived in view of the problems described above, and an object thereof is to provide a resource management system and a resource management method that are capable of enhancing the utilization efficiency of resources in accordance with a changing situation.

Solution to Problem

A resource management system according to one aspect of the present invention has: a plurality of physical computers providing resources; a plurality of virtual computers executing at least one of application programs; and an integrated resource management unit coupled communicably to the plurality of physical computers and the plurality of virtual computers, wherein the integrated resource management unit prepares a plurality of containers for managing some of the resources to be associated and providing these resources as virtual resources and manages a resource division that defines a use range of the provided virtual resources, the containers are associated with any of application programs, and, upon receipt of a resource configuration change request regarding an application program to be operated in the resource division, migrates the resources managed by the other containers to the containers associated with the application program, and the amount of resources managed by the other containers is occasionally lower than the amount of virtual resources provided by the other containers.

Advantageous Effects of Invention

According to the present invention, the containers are associated with any of the application programs, and upon receipt of a resource configuration change request regarding an application program operated in the resource division, the resources managed by the other containers are migrated to the containers associated with the application program. According to the present invention, therefore, the resources can be migrated in accordance with a changing situation, improving the utilization efficiency of the resources.

BRIEF DESCRIPTION OF DRAWINGS

FIG. 5 is a configuration diagram of a table that manages instances.

FIG. 6 is a configuration diagram of a table that manages tenants.

FIG. 7 is a configuration diagram of a table that manages containers.

FIG. 9 is an example of tables that define resource requirements requested by the applications.

FIG. 10 is a configuration diagram of a table for integrally evaluating the performances of the containers.

FIG. 12 is a flowchart showing a process for migrating an access authority.

DESCRIPTION OF EMBODIMENTS

An embodiment of the present invention is described hereinafter with reference to the accompanying drawings. However, the present embodiment is merely illustrative to realize the present invention and are not construed as limiting the technical scope of the present invention. A plurality of features disclosed in the present embodiment can be combined in various ways. The processes and operations in the present embodiment are described based mainly on the operations of "computer programs" (used as the subject of each sentence). The computer programs are executed by a microprocessor. Therefore, it may be interpreted that the processes and operations in the embodiment are implemented mainly on the basis of the operations of the processor.

According to the present embodiment, in a cloud environment where a plurality of applications exist and are operated, the resource utilization efficiency of the entire data center is improved by allowing the resources to be dynamically lent in response to changes in demands of the computer system, beyond the resource areas that are defined with respect to tenants or applications.

In the present embodiment, the performance characteristics (resource requirements) requested by the plurality of applications are acquired from an application management unit that manages each of the applications. In the present embodiment, resource demands corresponding to all of the resources are integrally calculated in consideration of the performance characteristics requested by the applications.

Moreover, in the present embodiment, the arrangement of all of the resources is planned based on the resource demands that take into consideration the performance characteristics requested by the applications. In the present embodiment, a resource pool is reconfigured beyond the application-specific resource areas.

According to the present embodiment, in a data center where the demands constantly change, the utilization rates of all of the resources can be optimized without contradicting a resource management system or application management system of each tenant. Furthermore, according to the present embodiment, the know-how for application management that was cultivated in the conventional operation can continuously be utilized, while ensuring security of each tenant.

Example 1

A first example is now described with reference to FIGS. 1 to 12. The present example configures so as to fulfill the resource requirements requested by the applications, and improves the utilization rates of all of the resources.

<System Configuration>

Figure 1:
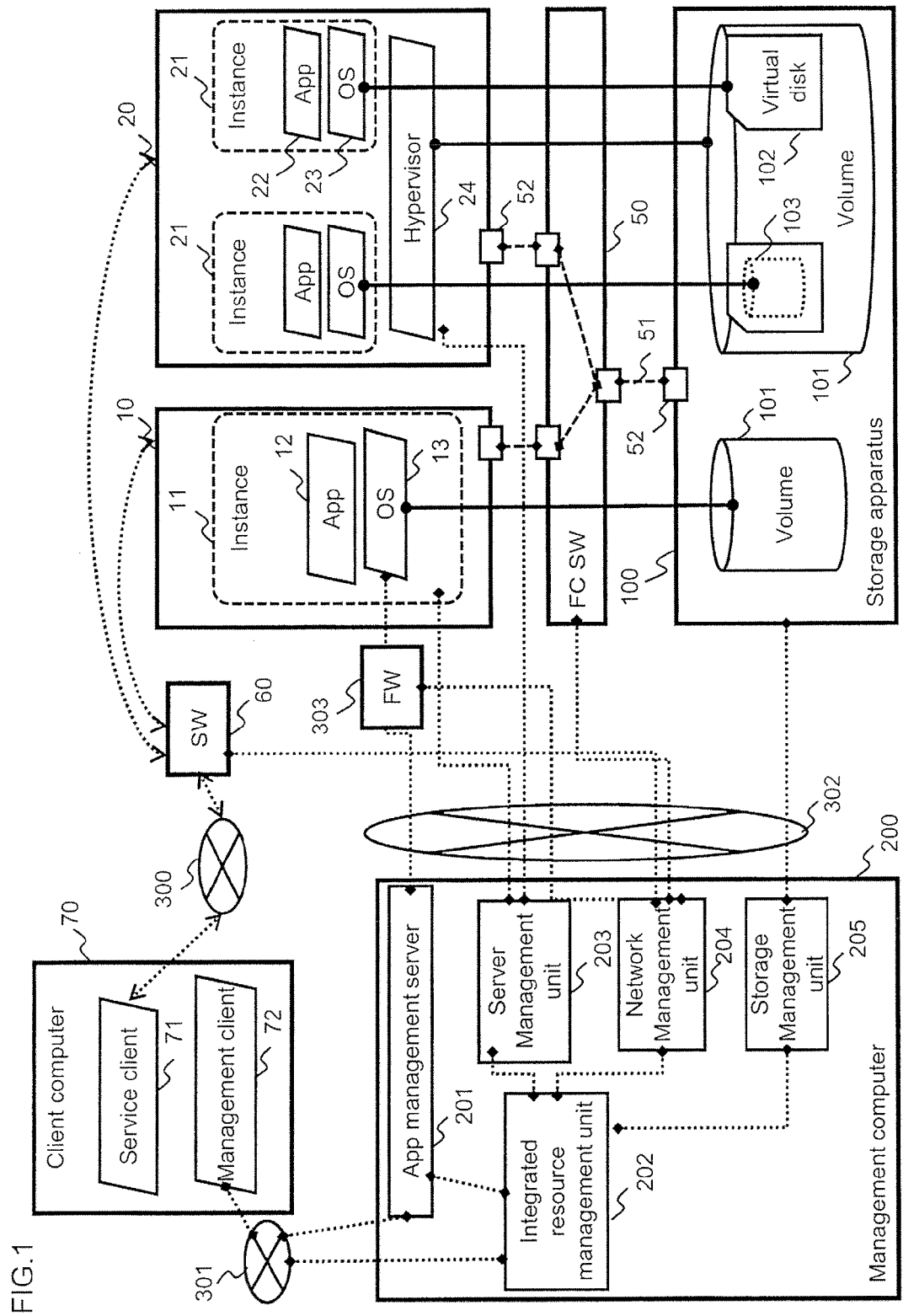
FIG. 1 is a configuration diagram of a computer system that manages resources.

FIG. 1 shows a configuration of a computer system according to the present example. The computer system can be configured by, for example, hosts 10 and 20 that operate information processing services, a client computer 70 that is used by a user requesting for the services, and a management computer 200 that manages the computer system.

The host 10 is configured based on a general computer architecture by, for example, a physical CPU, memory (main storage apparatus), input/output apparatus, network interface, and internal bus for mutually coupling these constituents.

An OS (Operating System) 13 that directly controls physical processing resources is operated on the host 10. An application manager or the user can directly control the logical configuration of the host 10 by using the OS 13 on the host 10 as a guest OS 13.

Because the guest OS 13 can control the configurations of all of the physical processing resources of the host 10, the host 10 is called "bare metal host 10" in the present example. In the present example, a logical server configuration controlled by the guest OS 13 is called "instance 11." By operating one or more applications 12 in the instance 11, the user can enjoy a desired information processing service. Note that the applications are occasionally abbreviated as "App" throughout the diagrams.

The host 20 has the same configuration as the host 10 but also has a hypervisor 24 or virtual software called "virtual machine monitor." The virtual software logically divides a physical resource into one or more guest OS areas, which are provided to the application manager or the user. These guest OS areas are generally called "virtual machines 21" or "logical partitions," and the host 20 is called "virtual machine host 20."

On account of a virtual software system, these guest OS areas may be virtual machines that share a CPU core or other physical components by means of, for example, time scheduling, or logical partitions with which the physical components are fixedly associated. For simplification, the guest OS areas are simply referred to as "virtual machines" without being particularly distinguished. Guest OSs 23 are operated in the virtual machines, as well as applications 22 used by the user. Each of the virtual machines corresponds to a single logical server configuration. As in the bare metal host 10, the virtual machines are referred to as "instances 21." The computer system according to the present example uses a physical server and a physical storage sharing the same configuration, as the bare metal host 10 and the virtual machine host 20, respectively. However, the instance 11 on the bare metal host 10 and the instances 21 on the virtual machine host 20 are simply referred to as "instances 11" in the following description without being discriminated, unless otherwise specified.

In a system that is generally called "cloud" which dynamically creates an instance in response to a user request, a virtual machine is often used. When using a virtual machine, the instance configuration can be separated from the physical resource configuration of a host. Therefore, the server configuration for operating an application can be generated flexibly and promptly, and the generated server configuration can be changed easily.

On the other hand, because the virtual machines share the physical resources of the virtual machine host 20, it is inevitable for the performances of the virtual machines to be affected by the other virtual machines provided in the same virtual machine host 20. This type of environment is not suitable for applications that are extremely demanding for performance, such as a database that requires a stable disk I/O (Input/Output) performance.

The present example, therefore, provides the bare metal host 10 that corresponds one-on-one to a physical resource. The present example utilizes the bare metal host 10 to provide a server environment that has a stable performance. The present example also can realize resource allocation suitable for the performance requirements or life cycles of the applications, by providing an environment that can use both the virtual machine host 20 and the bare metal host 10.

A storage apparatus 100 functions to provide each of the instances 11, 21 with a storage resource. The storage apparatus 100 is a computer system specialized in data input/output processing and has a CPU, a memory, and the like. The CPU of the storage apparatus 100 operates a control program for controlling the configurations of the storage resources. This control program provides logical areas called "volumes 101" with physical storage media respectively, such as an HDD (hard disk drive). Examples of the storage media include not only an HDD but also a flash memory device, MRAM (Magnetoresistive Random Access Memory), a Phase-Change Memory, a ReRAM (Resistive random-access memory), a FeRAM (Ferroelectric Random Access Memory), and the like.

In case of the bare metal host 10, an OS 13 thereof recognizes a volume 101 as a storage resource (logical device). Data required by the OS 13 and application 12 is read/written from/to the volume 101.

In the virtual machine host 20, the hypervisor 24 further divides the volume 101 into areas called "virtual disks 102." The virtual disks are, in most cases, files on a file system. An OS 23 on each virtual machine 21 recognizes a data area of each virtual disk 102 as a virtual volume 103.

The hosts 10, 20 and the storage apparatus 100 are coupled to each other by a SAN (Storage Area Network). An actual example of the SAN is an FC_SAN. The FC_SAN comprises one or more fiber channel switches (FC SW) 50, a fiber channel cable 51, and an HBA (host bus adapter) 52 for coupling data input/output apparatuses.

Examples of implementation of the SAN include not only a fiber channel but also an iSCSI (Internet Small Computer System Interface), a FCoE (Fibre Channel over Ethernet™), Infini-band, and other types of devices and protocols capable of achieving the same object such as large-capacity data communications.

The hosts 10, 20 that provide services, the client computer 70 that requests for the services, and the management computer 200 that manages the computer system, are mutually coupled by communication networks. The communication networks are physically linked to one another by an Ethernet™ switch 60 or a cable and bi-directionally communicate application data and control information using a protocol such as a TCP/IP.

In the present example, these communication networks are roughly divided into a service network 300 and management networks 301, 302. Traffic that is communicated by the service client 71 and the applications 12, 22 mainly flows through the service network 300. The service network 300 transmits/receives data required for an information processing service.

On the other hand, traffic that is communicated by the management client 72 or each of management servers 201, 203, 204, 295 and a control component within each of the apparatuses 10, 20, 50, 100, mainly flows through the management networks. The management networks transmit/receive control data required for managing the configuration of each of the information processing apparatuses 10, 20, 50, 100.

These communication networks may physically be separated from each other or divided by a logical network such as a layer 3 switch configuration or layer 2 switch configuration (VLAN, virtual local area network). Also, on the management network 302 is a firewall 303 for controlling the communications mainly between the application management server 201 and each of the hosts 10, 20.

The firewall 303 functions to allow or block connection from, for example, a specific application management server 201 to a specific host in response to a request from the network management unit 204. The firewall 303 establishes or blocks the communications by using an IP address or a host name.

As with the hosts 10, 20, the client computer 70 is physically configured based on a general computer architecture by a CPU, a memory, and a non-volatile storage device. The client computer 70 has the service client 71 and the management client 72. The service client 71 is software that is provided with the information processing services from the applications 12, 22 on the hosts 10, 20. The management client 72 is software that is coupled to the management computer 200 to manage the configuration of the computer system.

The software 71, 72 on the client computer 70 do not have to be special programs but may be versatile programs, such as web browsers, as long as they function to achieve a common objective. The service client 71 may be provided for each application or configured to be able to manage a plurality of applications by itself. Similarly, the management client 72 may be provided for each apparatus to be managed or may be configured to be able to manage a plurality of target apparatuses.

The management computer 200 changes the configuration of the computer system in response to a user request transmitted from the client computer 70. The management computer 200 has a general computer architecture as with the other computers and operates therein management programs required for realizing various functions.

The management programs described in the present example are, for example, the application management server 201, the integrated resource management unit 202, the server management unit 203, the network management unit 204, and the storage management unit 205. Each of the management programs may be broken down by function, or the plurality of management programs may be configured into one program. A plurality of the management computers 200 may collaborate with each other to operate these management programs. At least some of the management programs may be disposed in a scattering manner in some of the management targets. Examples of the destination in which these management programs are disposed include an agent program on the host 10 or the FC SW 50.

In fact, managers use these management programs. Depending on the range of apparatuses administered by each of the managers or the duty of each manager, a plurality of the management programs are prepared, or access control to each of the functions of the management programs is addressed by account authentication.

The application management server 201 functions to manage the applications 12, 22 on the respective instances 11, 21. The applications 12, 21 generally have their own unique data structures, functions, and process flows that are designed for the applications to process data themselves. Therefore, in order to manage the applications 12, 22, the dedicated application management server 201 is occasionally required.

An application manager who manages a widespread application is experienced and skilled at his/her own way of managing the application and at operating his/her application management server. Thus, with a combination of application management and resource configuration management, the application manager can acquire a great degree of convenience of taking advantage of his/her technical know-how.

In regard to an application that requests for a resource configuration such as a performance requirement, the application management server may function to manage a part of the resource configuration. In the present example, therefore, the application management server 201 and the integrated resource management unit 202 are configured to transmit/receive control information to/from each other in order to change the configurations of the management targets. In order to realize collaboration between the application management server 201 and the integrated resource management unit 202, for example, a plug-in is provided to the application management server 201 and an API (Application Programmable Interface) is provided to the integrated management unit 202.

The application management server 201 can also have, exclusively from the other application management servers, authorization for designating a specific physical apparatus as a management target and changing the configuration of this specific physical apparatus.

The hypervisor 24 can be considered as an application, since it is deployed on the physical host. Thus, a hypervisor management server for managing the hypervisor 24 may be provided.

The resource configuration of each of the apparatuses 10, 20, 50, 60, 100 managed by the management computer 200 is managed by the integrated resource management unit 202 and each of the apparatus management units. The apparatus management units are the server management unit 203, the network management unit 204, and the storage management unit 205. Each of the apparatus management units manages the configurations of the physical server apparatuses such as the hosts 10, 20, the network switches such as the FC SW 50 and the Ethernet SW 60, and the storage apparatus 100, via the management network 302.

More specifically, each of the apparatus management units functions to change the configuration of the logical resources operated on the apparatuses to be managed, acquire or accumulate operation information on the resources, or configure attribute values.

Each of the apparatus management units may be a special management program provided by a vendor that develops or manufactures the apparatuses. Each of the apparatus management units and the integrated resource management unit 202 transmit/receive control information to/from each other by using a management interface such as an API.

The integrated resource management unit 202 controls each of the apparatus management units in response to a request from the management client 72. Assisted by each apparatus management unit, the integrated resource management unit 202 creates an instance or modifies the configurations of the apparatuses, as required to implement configuration modification. A specific configuration of the integrated resource management unit 202 is described hereinafter.

<Method for Managing Resources in a Tenant>

As a result of the development of the server virtualization technology and storage virtualization technology, a large number of information processing systems are now gathered in hardware in one place. In response to such situation, the conventional operation form where, for example, each department owns hardware has been changing in recent years to an operation form where a plurality of departments share the common hardware.

However, due to a strong demand for dividing the system environment by department, a logical configuration called "tenant" is formed to logically divide the resources. A tenant is an example of the "resource division." A tenant has various configuration information items associated therewith, the configuration information items including, for example, users or a group of users belonging to the tenant, the definition of authority of the manager managing the tenant, and resources available in the tenant. Incorporating the tenant, which is a resource division, can allow a plurality of user groups to share hardware or the physical data center while maintaining security among user groups as wells as the independence thereof on its processing performance, enhancing the utilization rates of the entire resources. The tenant is, for example, a group of users sharing the resources.

As described above, there may exist a plurality of management programs. Especially in an environment providing a plurality of tenants, the application management server 201 is provided for each of the tenants. This is because the information processing systems managed by the application management server 201 keep a large volume of confidential information such as customer data and business data.

From a perspective of security of a company, such confidential information must not be shared by a plurality of tenants. However, there is a number of applications that change not only a method for processing or managing data but also the resource configurations, depending on the definitions of data to be treated. For this reason, it is better to construct the application management server 201 independently for each tenant. The application management server 201 can specify the physical resources that the application management server 201 manages by itself, and use the physical resources exclusively from the other types of application management servers.

Incidentally, among the configuration management information items owned by a tenant is the amount of resources. A usage fee charged to each user is a pay-per fee that is calculated based on the amount of resources used by each user.

Due to the virtualization technologies, the amount of physical resources kept in the computer system does not necessarily match the amount (the amount of virtual resources) that each user can make an agreement with. The total amount of resources that each user can make agreement with can be made greater than the actual amount of physical resources.

However, the frequency of purchase of physical resources or the number of purchases of the same cannot be determined in disregard of the users' demand for resources. In addition, the levels of demands vary depending on the group to which users belong or the applications used by the users, and it is therefore impossible to predict a supply of resources without taking these facts into consideration.

The simplest and the most common way, therefore, is to partly determine in advance the amount of physical resources used by each group of users making agreements, i.e., each tenant. However, the utilization rate of a single physical resource (apparatus) is enhanced by allowing a plurality of tenants to share the physical resource by using the virtualization technologies. Such a range of resources available to a certain tenant is called "resource pool."

An example of managing the resources in a tent by using the resource pool is now described with reference to the comparative example shown in FIG. 2.

A user 301 creates an instance 11 (or 21) in order to use a desired application. A physical resource that is required for operating the instance is managed in a resource pool 303 beforehand.

The resource pool 303 is configured by the apparatus managers using the apparatus management units on the management computer 200. The apparatus managers are, for example, a server manager 305a, a network manager 305b, and a storage manager 305c. The apparatus management units are, for example, the server management unit 203, the network management unit 204, and the storage management unit 205.

In the resource pool 303, a combination of resources required for configuring the instance, such as the host 10 (or 20), an isolated network 304, and the volume 101, is registered beforehand by each of the apparatus management units.

Various management operations such as creating an instance and changing the resource configuration are executed by the user 301 communicating with the management client 72, and are completed by a self-service provided by the user 301. The user 301 may inquire in advance with application management servers 201a, 201b about a requirement that is requested by an application to be introduced, and designate the requirement upon execution of the various management operations.

The management client 72 functions to request each of configuration management components about an operation associated with at least management of the configuration of the instance. From among the resources registered in the resource pool 303, the application management servers 201a, 201b configure, in advance, the resources to be managed as dedicated areas in each application. Therefore, the application management servers 201a, 201b can accumulate the detailed configurations or operation information of the physical resources and manage the applications more efficiently. The application management servers 201a, 201b are referred hereinafter as "application management server 201," unless otherwise specified.

Once the instance 11 (or 21) is prepared in a tenant 300, the user 301 notifies the application management server 201 of a desired instance, and constructs a desired application in the desired instance.

If necessary, when creating an instance or constructing an application, the user 301 may collaborate with an application manager 306 to examine the detail of the resource configuration or ask the application manager 306 to design the application. Moreover, the application management server 201 may be allowed to create a new instance for constructing an application or to migrate an instance onto a dedicated physical apparatus, so that the application management server 201 can manage the physical apparatus in which the instance is operated.

In the example described above, a dedicated application management server 201 is provided for each tenant 300, and the instance 11 (or 21) is created using the physical resources provided in the resource pool 303.

Each application management server 201 takes exclusive possession of the specific resources (the host, network, volume, etc.). Each application management server 201 manages its own management-target application exclusively from the other application management servers.

For instance, a tenant configured by the virtual machine host 20 can smoothen the loads and improve the resource utilization rate without stopping the applications (businesses), by migrating an application between virtual machine hosts in accordance with the performance load of the instance 21 or adding/deleting a resource to/from the resource pool 303.

Figure 2:
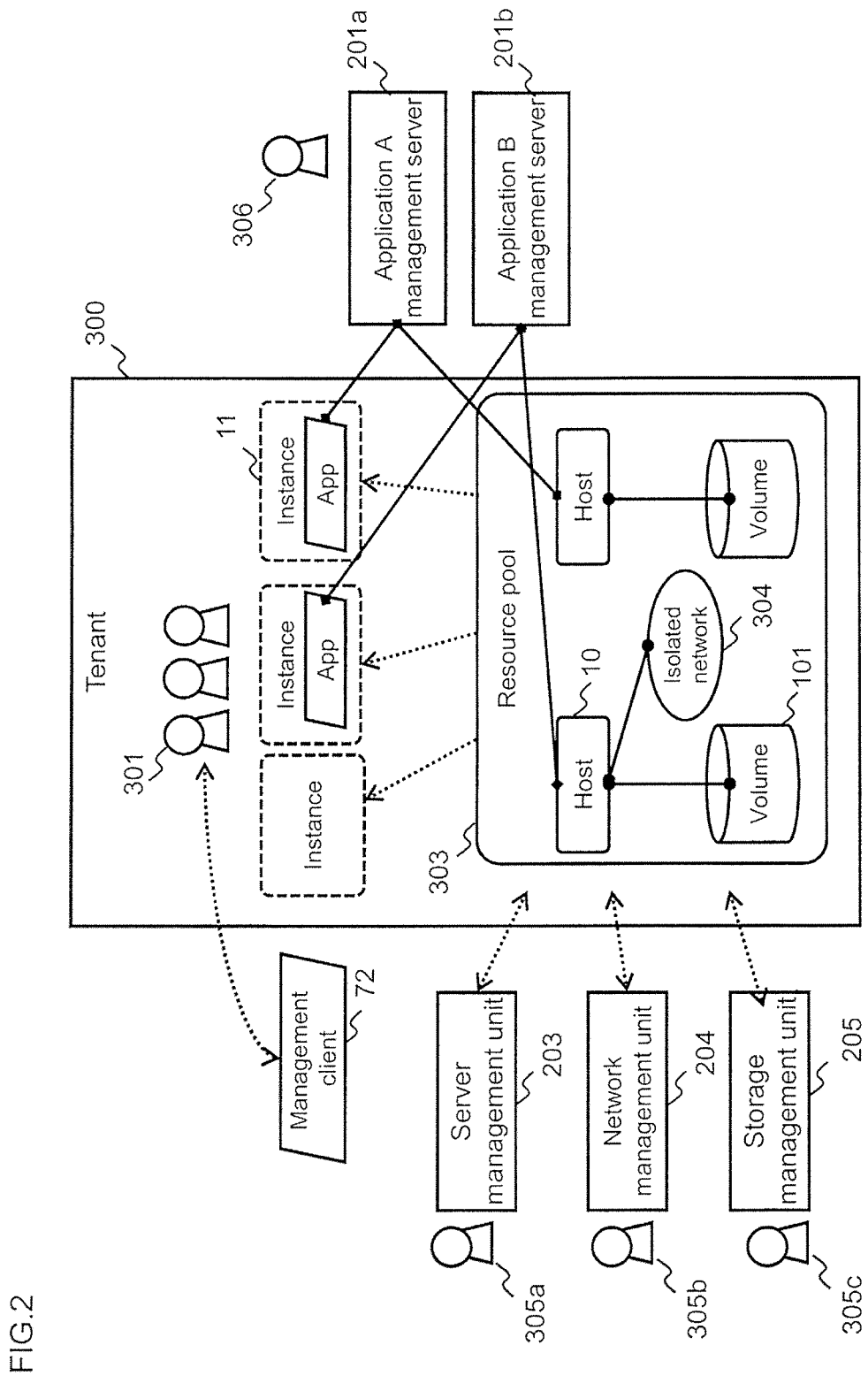
FIG. 2 is an explanatory diagram showing the outline of a resource management method as a comparative example.

However, improvement of the resource utilization rate in the configuration illustrated by the comparative example in FIG. 2 is inevitably confined in the same tenant. Furthermore, from a perspective of ensuring security, based on the comparative example shown in FIG. 2, it is difficult to allow a plurality of tenants to share the application management server.

In the resource management system of the present example, therefore, the resource utilization rate of the entire data center is optimized by combining application management and resource management, as described hereinafter. More specifically, the resource pools to be allocated to the tenants are dynamically configured based on the application requirements or operation information.

Figure 3:
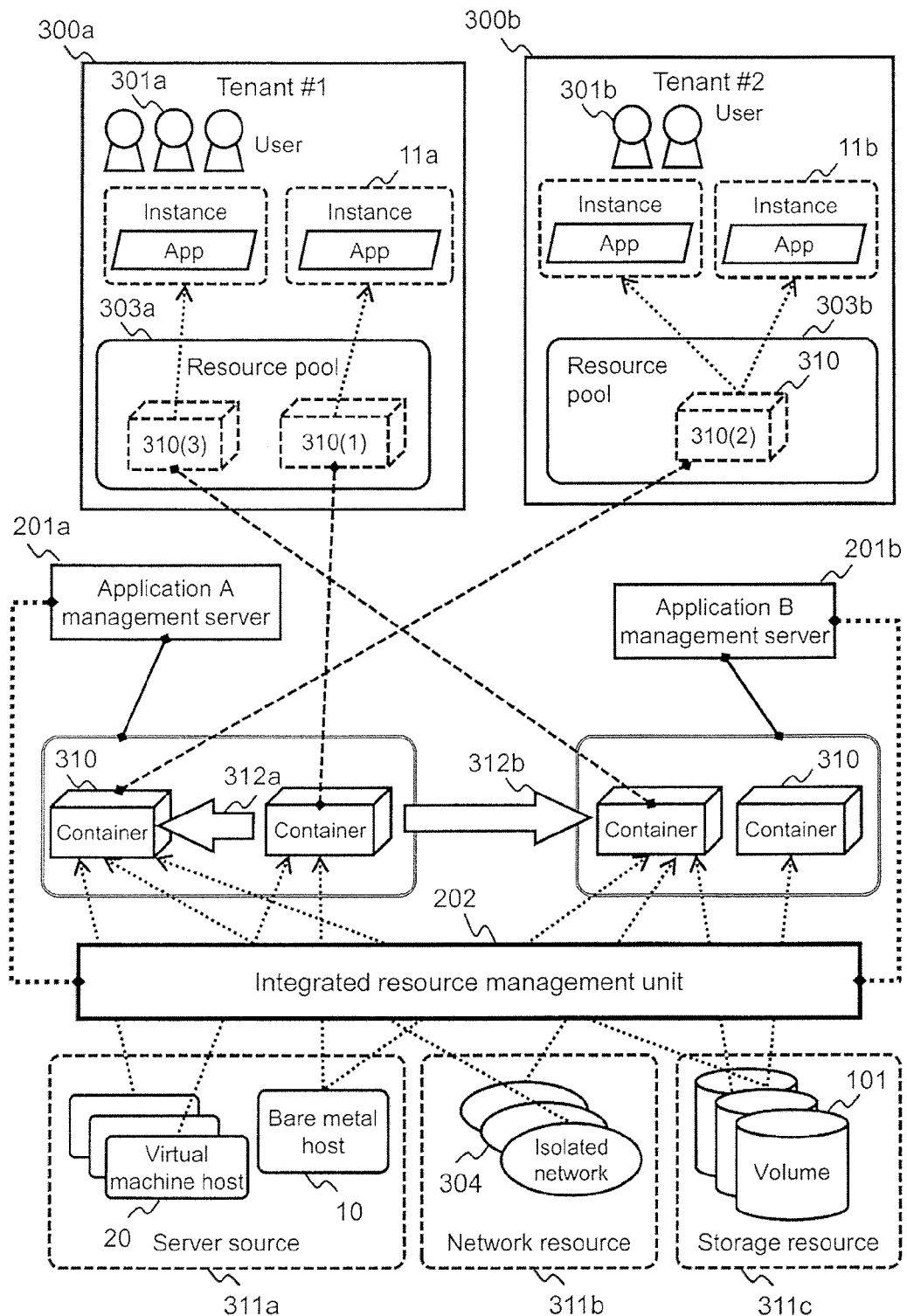
FIG. 3 is an explanatory diagram showing the outline of a resource management method as a present example.

FIG. 3 is an explanatory diagram showing the outline of the resource management system and the resource management method according to the present example. One of the characteristics concepts of the present example is a container 310 that manages some of the resources to be associated, and provides these resources as virtual resources. The container 310 is a constituent corresponding to a physical resource (physical apparatus) that is registered in the application management server 201 in the comparative example shown in FIG. 2. The container 310 plays a role in virtualizing an actual physical hardware configuration. Note, in the following description, the alphabets affixed to reference numerals are omitted, unless otherwise specified. For example, tenants 300a, 300b are often described as "tenant 300," resource pools 303a, 303b as "resource pool 303," and the application management servers 201a, 201b as "application management server 201."

In each tenant 300, the container 310 is used as a resource pool corresponding to each application. Each tenant manages the resource information such as the amount of contract resources for each tenant.

The integrated resource management unit 202 configures all physical resources as the containers 310 in advance, and registers the physical resources in each application management server 201 as the management targets. As described hereinafter, virtual resource configurations to be provided by the containers 310 do not have to match the physical resource configurations to be registered in the containers. Thus, the amount of resources in each container 310 can be defined beyond the total amount of physical resources.

The physical resources, or "resources," which are associated with the containers 310 are, for example, servers (computer resources), networks (communication resources), storage resources, and the like. The containers 310 are configured by a combination of these physical resources and can be registered as the targets to be managed by the application management server 201.

A server cluster that is configured by a plurality of servers is occasionally used as a server resource 311a when using, for example, the bare metal host 10, the virtual machine host 20, or a logical partition host alone. The logical partition (LPAR) host is a server resource that is obtained by logically dividing each component such as a CPU or a network adapter. Examples of the server cluster include a redundant virtual machine host 20, a redundant bare metal host 10, or a server group having a SMP (symmetric multiprocessing) configuration obtained by coupling busses of a plurality of servers.

A network resource 311b is, for example, a virtual LAN, a subnet, or a virtual private network that is controlled by a layer 2 or layer 3, and is within a range enabling communication between the hosts (isolated network). Alternatively, the network resource 311b may be an appliance functioning as a network such as a firewall, a load balancer, a VPN (Virtual Private Network), or a gateway.

A storage resource 311c is, for example, a volume 101 provided by the storage apparatus 100, a directory on a network file system.

These resources 311a, 311b, 311c may each be a specific apparatus provided in the data center, or a server instance or object storage obtained from an external IaaS cloud.

The configuration of each container 310 is managed by the integrated resource management unit 202. Each application management server 201 obtains a necessary container 310 by requesting the integrated resource management unit 202 for a resource.

Each application management server 201 can take exclusive possession of a desired container 310 and use this container 310 as a resource area exclusively for the relevant application. The integrated resource management unit 202 controls configuration management, such as determining which resource 311 to physically allocate to a certain container 310. The integrated resource management unit 202 can change the physical configuration of each container 310 without being concerned by the application management servers 201. In the present example, therefore, the resources can be lent among a plurality of applications or tenants without interference with the application management system, to smoothen the resource utilization rate.

For example, as shown by the arrow 312a in FIG. 3, the resources managed by the same application management server 201a can be adjusted between the containers provided to different tenants. Specifically, a resource of a first container 310(1) managed by the application A management server 201a is used in an instance 11a via the resource pool 303a of the first tenant 300a. A resource of a second container 310(2) managed by the same application management server 201a is used in two instances 11b via the resource pool 303b of the second tenant 300b.

When the load on the second container 310(2) used by the plurality of instances 11b increases, a user 301b that uses the instances 11b requests for an additional resource to the second container 310(2). This resource addition request is sent from the client computer 70 to the management computer 200 via the communication network 301. In response to this request, a resource is migrated from the first container 310(1) managed by the same application management server 201a to the second container 310(2). To facilitate understanding of such configuration, the first container 310(1) in which the number of resources decreases is occasionally referred to as "migration-source container," and the second container 310(2) to which a resource is added as "migration-destination container."

Suppose that the first container 310 satisfies predetermined migration-source selection conditions, such as having a low resource utilization rate. Examples of the conditions for selecting a migration-source container include the fact that the resource utilization rate is equal to or lower than a reference value (or the utilization rate is the lowest), the fact the first container 30 has a function essential to an application that uses a resource migration-destination container (that an application restriction condition is satisfied), and the fact that there is no performance degradation such as a bottleneck. Other conditions may be added to a migration-source selection condition, or some of these conditions may be removed from the migration-source selection condition.

Migrating a resource from the first container 310(1) to the second container 310(2) results in an increase in the processing ability of the second container 310(2) and a decrease in the load thereof.

FIG. 3 also shows an example of adjusting the resources between different applications (312b). In the illustrated example, a third container 310(3) managed by the application B management server 201b is used in the instance 11a via the resource pool 303a of the first tenant 300a. Note that the application management server 201b also manages another container 310, but this container 310 is not used.

For example, in a case where a user 301a wishes to improve the response ability of the instance 11a that uses the third container 310(3), the user requests the management computer 200 to add a resource to the third container 310(3). In response to this request, some of the resources allocated virtually to the first container 310(1) is migrated to the third container 310(3). Similarly, in order to satisfy the predetermined migration-source selection conditions, the first container 310(1) is selected as the resource migration-source container.

The containers 310 that are created and managed by the integrated resource management unit 202 can virtualize the resources presented to the application management servers 201. Therefore, for example, even when there are changes in the configurations of the physical apparatuses allocated to the containers 310, such as addition/deletion of the recording media, the application management servers 201 are not involved with such changes in the configurations of the physical apparatuses. The application management servers 201 can manage the applications regardless of the changes in the configurations of the physical apparatuses.

Figure 4:
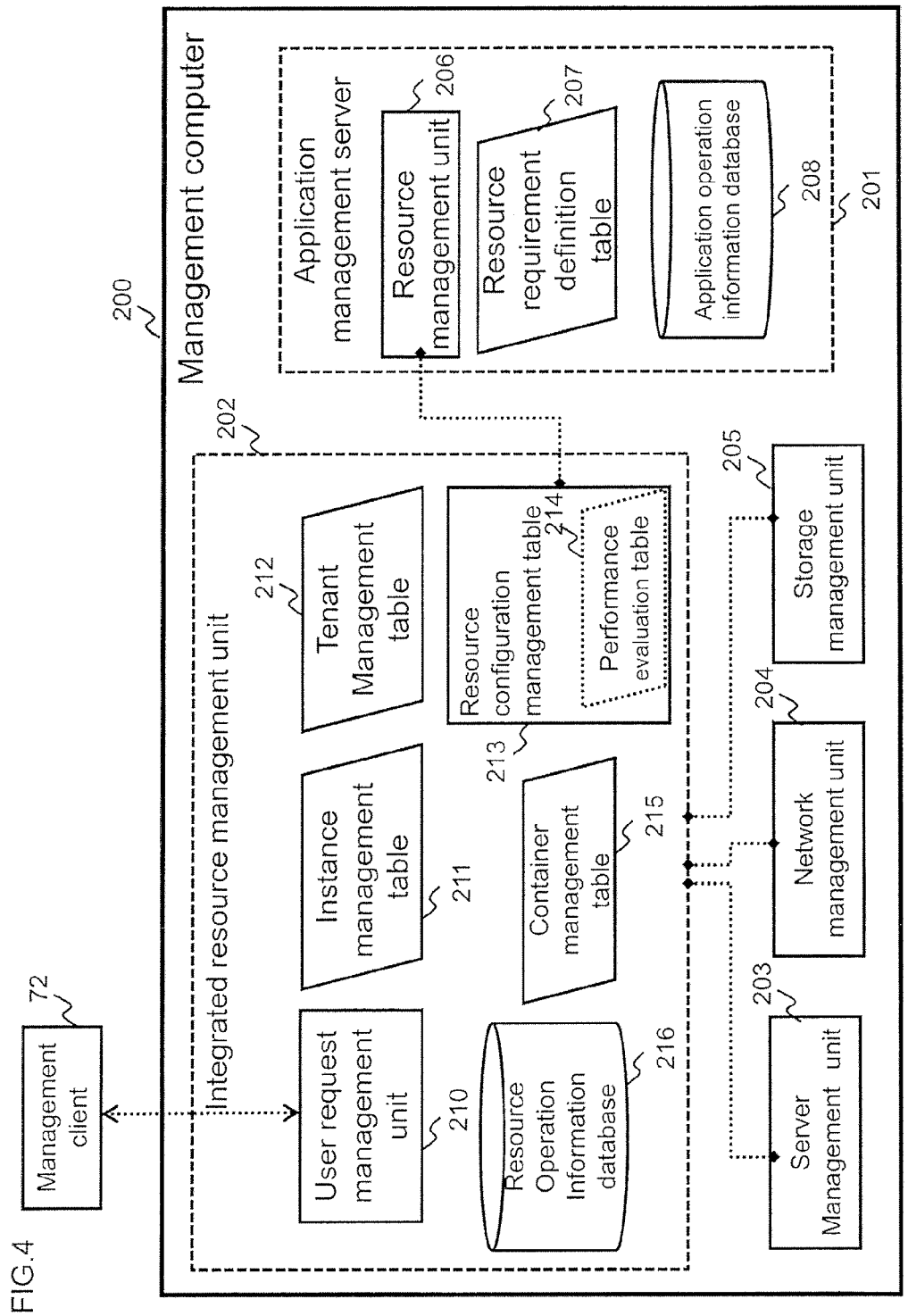
FIG. 4 is an explanatory diagram showing management programs provided to a management computer.

FIG. 4 shows a management component group for realizing the functions that are characteristic of the present example, the management component group being provided in the management computer 200. As described above, the integrated resource management unit 202 functions to distribute the resources to the containers in accordance with the resource utilization rate.

A user request management unit 210 functions to manage user requests. The user request management unit 210 receives, from the management client 72, a configuration change request such as a user's instance creation request. The user request management unit 210 returns, to the management client 72, the result of changing the configuration, which is performed by the integrated resource management unit 202. Upon receipt of a plurality or requests from the management client 72, the user request management unit 210 controls the execution sequence, the progress, and the like.

The integrated resource management unit 202 keeps the configuration information provided to the users and application management servers 201, by using an instance management table 211 and a tenant management table 212. The virtual resource configurations provided to the tenants 300 or the application management servers 201 are managed with respect to the containers 310 and kept in a container management table 215.

A resource configuration management unit 213 functions to manage the resource configurations and operates in collaboration with the application management servers 201. The resource configuration management unit 213 controls the relation between each container 310 and a corresponding physical apparatus (resource) with reference to the operation information kept in a resource operation information database 216.

The resource configuration management unit 213 processes the operation information of each resource in accordance with a preset management method, and stores the processing results in a performance evaluation table 214. Specifically, the resource configuration management unit 213 evaluates and processes the resource operation information based on the resource requirements (performance requirements) requested by the applications, and stores the results of evaluation/processing in the performance evaluation table 214.

The integrated resource management unit 202 then transmits control instructions on the configurations of the management target apparatuses 10, 20, 50, 100 to the apparatus management units 203, 204, 205.

The apparatus management units 203, 204, 205 acquire and store the utilization rate and actual performance of each management target apparatus into the resource operation information database 216. The resource operation information database 216 functions to provide the histories of the operation information for each constituent based on apparatus identifiers or time periods that are kept in the container management table 215.

The functional configurations of the application management servers 201 are now described. Each application management server 201 has, for example, a resource management unit 206, a resource requirement definition table 207, and an application operation information database 208.

The resource management unit 206 requests the integrated resource management unit 202 for a configuration change in order to manage the configuration of a target resource used by an application. The application management server 201 establishes a requirement suitable for the application, and keeps this requirement in the resource requirement definition table 207. Because the resource requirements vary depending on the types of applications, the format of the resource requirement definition table 207 managing the resource requirements is not constant either and is therefore likely to change depending on the applications.

The application operation information database 208 keeps the operation information including settings or performance values corresponding to the applications. Examples of the operation information on the applications include computation resources, connections established between the service client 71 and the applications, and usage statuses of the connections. Examples of the computation resource include the processes, threads, memory spaces and the like used by the applications. Examples of the usage statuses of the connections include a response time and the number of transactions. These operation information items have their own names, attributes, and other data structures based on the designs of the applications.

FIG. 5 shows the instance management table 211 that stores the settings and attributes managed with respect to the instances. The users are provided with the information described in the instance management table 211, via the client computer 70. In other words, the users are provided with abstracted identification information on the physical apparatuses allocated to the instances. The users do not have to know which physical resources are actually allocated to the instances 11 that the users use.

The instance management table 211 keeps, for example, an instance identifier 211a, an instance owner 211b, a resource pool 211c to which the instances belong, a container 211d, a resource configuration 211e, a network policy 211f, a grade 211g, a consumed point 211h, a usage period 211j, and of necessary) an application management server ID 211k, which are associated with one another.

As described above, the instances 11 represent logical computers that have the guest OSs. The instances 11 indicate the abstracts of the physical apparatuses; therefore, the virtual resource configurations 211e are defined in the table 211.

The instance identifier 211a indicates information for uniquely identifying the instances 11. The owner 211b indicates information for uniquely identifying the users who use the instances 11. The resource pool 211c indicates information for uniquely identifying the resource pools 303 to which the containers 310 used by the instances 11 belong. The container 211d indicates information for uniquely identifying the containers 310 that provide the instances 11 with resources.

The resource configuration 211e is configured by a CPU, a memory, and other constituents, as with a general computer architecture. The contents of the resource configuration 211e can be configured individually in response to a user request. As a catalogue template that is kept in the user request management unit 210, model data of the resource configuration 211e may be prepared. However, the resource configuration 211e is configured in such a manner that the total number of resource configurations 211e of the instances having the same container identifier 211d does not exceed the resource capacity provided by each container 310. Since the containers 310 are obtained by defining the virtual resource configurations as described above, the resource configuration 211e does not necessarily match the resource configurations of the physical apparatuses associated with the containers 310.

The network policy 211f is for configuring protocols to be used in regard to the communications between instances and communications between another host on a public communication network and instances, as well as authorized or unauthorized communications thereof. The grade 211g configures a service level that corresponds to the resource performances allocated to each instance.

The instances 11 can be associated with contract information based on contracts between, for example, a data center operator and the users. Examples of the contract information include the consumed point 211h for determining usage fees and the usage period 211j indicating the time remaining on each valid contract. Information on licenses, identification information on user applications and the like may also be managed in the table 211, depending on the subject matter or form of each contract.

If need be, each user can introduce a desired application to an instance and operate the application by notifying the application management server 211k or the application manager of the identifier 211d of the container used by the instance of the user.

FIG. 6 shows the tenant management table 212 that manages the tenants. The tenant management table 212 stores the settings and attributes managed with respect to the tenants. The tenant management table 212 keeps, for example, a tenant ID 212a, a user group ID 212b, a management role definition 212c, a resource pool ID 212d, an instance management table ID 212e, and an available balance point 212f, which are associated with one another.

The tenant ID 212a indicates information for uniquely identifying each tenant 300. The user group ID 212b indicates information for uniquely identifying each user group. The management role definition 212c indicates information for specifying information defining the role and management authority of each user. The resource pool ID 212d indicates information for uniquely identifying each resource pool 303 provided to the corresponding tenant. The instance management table ID 212e indicates information for uniquely identifying the instance management table 211 that manages each instance operated in the corresponding tenant.

In each tenant, security is ensured and the accessibility to the resource configuration information can be managed in the form of the network policy 211f described in the instance management table 211. The available balance point 212f indicates information on a usage fee of an available contract resource.

FIG. 7 shows the container management table 215 that manages the containers. The container management table 215 stores the settings and attributes managed with respect to the containers. The container management table 215 manages association of the container information and the physical apparatuses (resources), which is notified to the application management servers 201.

In the container management table 215, a container ID 215a and an access authority 215b, which are required for changing the configurations, are delivered to each application management server 201. Information 215c to 215k on the configurations of the physical apparatuses are not released to the application management servers 201.

The container ID 215a indicates information for uniquely identifying each container. The access authority 215b indicates information for uniquely identifying access authority information for accessing the containers to manage the logical resource configurations. The application management server 215c indicates information for uniquely identifying each application management server 201 managing the application using the container.

A combination of, for example, a server 215d, a network 215e, and a storage 215g is kept in the container management table 215 as a content of each container 310. The total amount of resources configuring each container 310 is kept in a virtual resource capacity 215j and an actual resource capacity k. The virtual resource capacity 215j and the actual resource capacity k each indicate the amount managed by the integrated resource management unit 202. However, while the actual resource capacity 215k is equal to the sum of resource capacities that is physically possessed by an apparatus managed as a single container, the virtual resource capacity 215j is a virtual resource capacity provided to each application management server 201. The actual resource capacity 215k and the virtual resource capacity 215j occasionally do not match, depending on the functions of the integrated resource management unit 202.

An instance type 215f indicates the type of each instance operated on the container. The configuration management method and the apparatus management units can be managed in the instance type 215f. For example, if a container is the virtual machine host 20, "VM" is configured in the instance type 215f, and if the container is the bare metal host 10, "PM" is configured in the instance type 215f.

The application management servers 201 cannot manage the containers 310 specified by the container IDs 215a, unless using the access authority information specified by the access authority 215b. However, only a specific application is sometimes available, depending on the configurations of the containers. Information for identifying an application that can use a container with a specific configuration, is configured in an application restriction 215h.

Examples in which only a specific application is available include a case where the operation of an application is guaranteed only for authenticated hardware in an application developer, a case where a predetermined hardware function is required for operating an application, and a case where the operation of an application is guaranteed only for a firmware configuration of a specific version.

The application restriction field 215h is configured manually or automatically by the managers or application management servers 201. When the configurations of the containers specified by the container IDs 215a are changed, the relevant values are updated.

<Method for Improving Configurations of Resource Pools>

In the present example, introducing the characteristic configurations, such as the containers 310, can separate the physical apparatus configurations from the logical apparatus configurations that are recognized by the application management servers 201 and the tenants 300.

In the present example, the physical apparatuses incorporated in the containers can be lent among different applications or different tenants, and the entire container can be replaced. Therefore, in the present example, the configurations of the resources to be allocated to the business systems (applications) can be dynamically changed in accordance with the usage statuses, without being affected by the existing application management system or tenant management system.

By allocating the resources to the containers based on a plurality of different types of application requirements (conditions for which the applications request the resources), the resource utilization rate of the entire data center can be improved. In this case, it is important to evaluate and adjust the different types of application requirements integrally.

Figure 8:
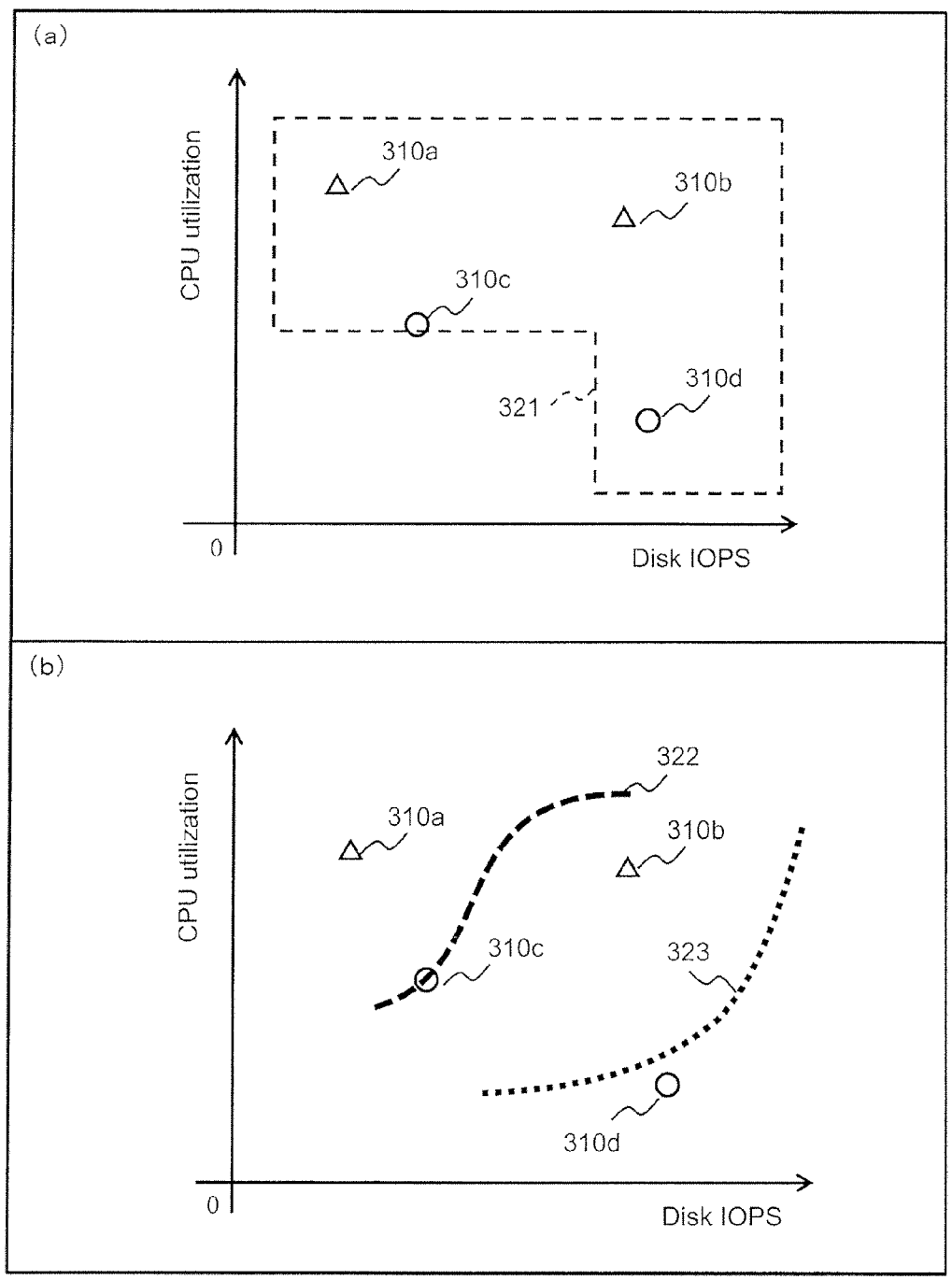
FIG. 8 is an explanatory diagram showing the concept of integrally evaluating performances of different applications.

FIG. 8 shows the concept of a method for evaluating the performances in view of the application requirements. For the purpose of illustration, FIG. 8 shows a two-dimensional plan view, but the same evaluation can be performed with a diagram of any positive number N-dimension corresponding to a performance index that is taken into consideration.

FIG. 8(a) shows a distribution of each of the containers 310a to 310d at certain performance indices (e.g., a CPU utilization rate, and a disk IOPS). In FIG. 8(a), the range of target performance values defined by the resource managers is shown in a dotted line 321.

One of the ideas is to, for example, define a service level by using the range 321 of target performance values based on the performances of the physical apparatuses (resources) and then provide each user with the service level as a grade.

When a requirement for each application operated on a container (resource request) is not taken into consideration, there is no other way but to employ and evaluate the performance indices of the physical apparatuses, as shown in FIG. 8(a). In such a case, the usage status of each container is evaluated based on the distance from the origin to each container. For example, the container 310c is analyzed to have a relatively low resource utilization rate, whereas the container 310b is analyzed to have a high resource utilization rate. It is determined that the containers 310a, 310b have unbalanced usage trends.

Naturally, the types of required resources vary depending on the types of the applications operated on the containers.

Thus, it is not appropriate to use a method for evaluating the performance indices uniformly with no regard to the types of the applications. In other words, as long as the resource requirements defined by the application management servers 201 and the technical knowledge on application management can be taken into consideration, the resource utilization rate can be determined fairly based on the resource demand trends among the containers.

FIG. 8(b) shows the performance evaluation method that takes into consideration the characteristics of usages of the resources that differs from application to application.

For example, in each of the containers 310a to 310d shown in FIG. 8(a), suppose that the application A is operated in the containers 310c and 310d, and the application B in the container 310a and 310b.

The resource usage trend of the application A is shown by a performance characteristic curve 322. The performance characteristic curve 322 corresponding to the application A is superimposed on the performance values of the containers 310c, 310d in each of which the application A is operated. As a result, it is clear that the container 310c has a resource utilization rate suitable for the application A. It is also clear that the container 310d is not suitable for the application A.

The possible reason that the container 310d is not suitable for the performance trend of the application A is because the other resource elements associated with the container 310d (e.g., the network performance, etc.) have bottlenecks and/or because the amount of CPU resources to be allocated to the container 310d is excessive.

The same analysis applies to the application B. A performance characteristic curve 323 showing the resource usage trend of the application B is superimposed on the performance values of the containers 310a, 310b in each of which the application B is operated, to make determination. It is clear that the container 310a is not suitable for the performance trend of the application B.

Examples of the measures for improvement considered in case of FIG. 8(b) include exchanging the containers 310a and 310d between the application A and the application B, and changing the resource configuration of the container 310a to the one similar to the resource configuration of the container 310d.

With at least three technical features of the present example, the resource utilization rate of the entire data center can be maximized by considering the characteristics of the applications. The first technical feature is the concept of "container" for separating the target resource configuration of the application management server 201 from the configurations of the physical apparatuses. The second technical feature is the form of expression for integrally comparing the resource requirements corresponding to different types of application. This form of expression is described hereinafter. The third technical feature is a configuration management method for lending the physical apparatuses (resources) among the plurality of containers.

As described above, the information related to the resource configurations required by the application management servers 201 are kept in the resource requirement definition table 207. The information related to the resource requirements are not constant with respect to the applications, and the forms of expression of the resource requirements kept in the application management servers 201 are also different.

FIG. 9 shows an example of the resource requirement definition table 207 that defines the resource requirements. For example, the resource requirement definition table 207 shown in FIG. 9(a) manages the association among a target 207a, a resource item 207b, a required level 207c, an operational status 207d, and an evaluation value 207e. The target 207a indicates information for uniquely identifying each container 310 used by an application. The resource item 207b is information indicating a resource item corresponding to the target container 207a. The required level 207c indicates a condition for which each application requests the corresponding resource. The operational status 207d is an actual measurement value of a performance index shown in the resource item 207b. The evaluation value 207e indicates information for determining whether the value of the operational status 207d satisfies the required level 207c or not.

FIG. 9(b) shows a resource requirement definition table 207(1) of another format. In this table 207(1), a target 207f and an evaluation value 207g are associated with each other and managed, but the other items (the resource item, required level, and operational status) are not managed.

As shown in FIG. 9(a), in some cases the performance requirements (207b) are defined for specific constituents (resources), and in some cases, as shown in FIG. 9(b), the performance requirements are defined using the response ability of each application, the number of processing threads, and other performance values that are not directly related to the resource requirements.

The form of expression for integrally comparing the resource requirements among different types of applications is described with reference to FIG. 10, the resource requirements being applied when the applications request for resources.

FIG. 10 shows the performance evaluation table 214 unique to the present example, which is used by the resource management unit 213 to calculate the operation information corresponding to all of the resources. The performance evaluation table 214 keeps a performance index 214b used for evaluating the container having a container ID 214a and its actual measurement value 214c, based on a resource requirement defined for each type of application.

The table 214 is also provided with correction coefficients 214d for equally comparing and evaluating the resource requirements corresponding to the plurality of types of applications. The actual measurement value 214c of each performance index 214b is corrected according to each correction coefficient 214d, and then the result of the correction is recorded as a correction value 214e. The correction value 214e is calculated simply as the product of the actual measurement value 214b and the correction coefficient 214d, and is a dimensionless value.

The performance indices 214b include not only an index indicating the level of the resource utilization rate but also an index indicating resource performance degradation. Examples of the index indicating resource performance degradation include an index by which the degree of performance degradation is expressed numerically, such as an I/O response time, and an index used for determining the comprehensive performance bottlenecks.

For example, when the CPU utilization rate is high, the calculated resource utilization rate is apparently high. In actuality, however, a swap process occurs due to the insufficient memory, and as a result the impact of the swap process is present in the form of a CPU load.

Therefore, in consideration of the performance bottlenecks, the performance evaluation table 214 has influence determination 214f that shows "+" if a positive affect is obtained and "−" if a negative effect is obtained, in order to improve the resource utilization rate.

A constituent (resource) to be selected as the performance index 214b may be configured automatically by each application management server 201 or manually by each manager.

The correction coefficient 214d is an important value for performing fair comparison between the performances of the containers 310 corresponding to the plurality of types of applications, and means the weight that gives a quantitative value for determining how much each performance index should be regarded as important. The resource performance characteristics corresponding to the respective applications described above can be expressed using the correction coefficients 214d.

For example, the CPU utilization rate corresponding to a container ID: CNT-A021 (the ratio of the CPU time to a total processing time) is 45%, whereas the CPU utilization rate corresponding to a container ID: CNT-A025 is 69%.

Apparently, this simple comparison shows that the latter container CNT-A025 has a higher resource utilization rate. In actuality, however, the application operated on the container CNT-A025 requires a higher computation performance in the CPU. Such a difference in characteristics between the applications is weighted according to each correction coefficient 214d to obtain the correction value 214e. The correction value of the container CNT-A021 having an actually measured CPU utilization rate of 45% is 90, and the correction value of the container CNT-A025 having an actually measured CPU utilization rate of 69% is 35. Calculation of a correction value in consideration of the difference in characteristics between the applications can express that the container CNT-A025 is not able to take full advantage of the CPU thereof and that the container CNT-A021 with a numerical value that appears to be low has a higher resource utilization rate.

The correction coefficients 214d may be configured manually by the application managers or automatically by the application management servers 201. The resource configuration management unit 213 may calculate the correction coefficients by statistically processing the operation information.

An example of the method for calculating the correction coefficients 214d based on statistical operation information is now described. According to the computation system of the present invention, however, suppose that the containers in which the applications are operated have a sufficiently large number of achievements in operating applications and that the histories of the operation information are kept in the computation system. For instance, when the required levels 207c are configured with respect to the resource items, as shown in FIG. 9(a), the correction coefficients are calculated in the following manner using these required levels as thresholds. A required level defining a lower limit and a required level defining an upper limit are discriminated from each other on the basis of the directions of the inequality signs of the required levels. For better understanding, in the following equations some of the variables are marked with reference numerals of the table items. The correction coefficients of these equations indicate the correction coefficients 214d shown in FIG. 10; therefore, the reference numerals are omitted accordingly.

$$\text{Correction coefficient}=\text{multiplying power/lower limit required level } 207c, \text{influence determination } 214f=(+) \qquad \text{Eq. 1}$$

$$\text{Correction coefficient}=\text{multiplying power/upper limit required level } 207c, \text{influence determination } 214f=(-) \qquad \text{Eq. 2}$$

The multiplying powers described above are calculated by, for example, the following equation using an allowable value for each performance value.

$$\text{Multiplying power}=(\text{application multiplying power})\times (\text{history maximum value}-\text{history minimum value})/\text{defined area} \qquad \text{Eq. 3}$$

The application multiplying power represents the degree of importance or popularity of an application and is evaluated based on the number of applications introduced (the number of instances). Alternatively, when the evaluation value 207g unique to an application is provided to a certain instance or container as shown in FIG. 9(b), the evaluation value 207g is calculated by the following equation.

$$[\text{Sum of all performance indices } 214b](\text{correction coefficient} \times \text{average value of performance histories})=\text{evaluation value} \qquad \text{Eq. 4}$$

Here, a system of equations is established in which the number of records of the resource requirement definition table 207 kept in the same application, is taken as the degree. The system of equations has the solution in a case where the performance indices 214b are independent from one another, and consequently the correction coefficient 214d is determined. In a case where one or more pairs of performance indices 214b are dependent, an approximate solution obtained by a least-squares method or the like may be determined as the correction coefficient 214d.

Figure 11:
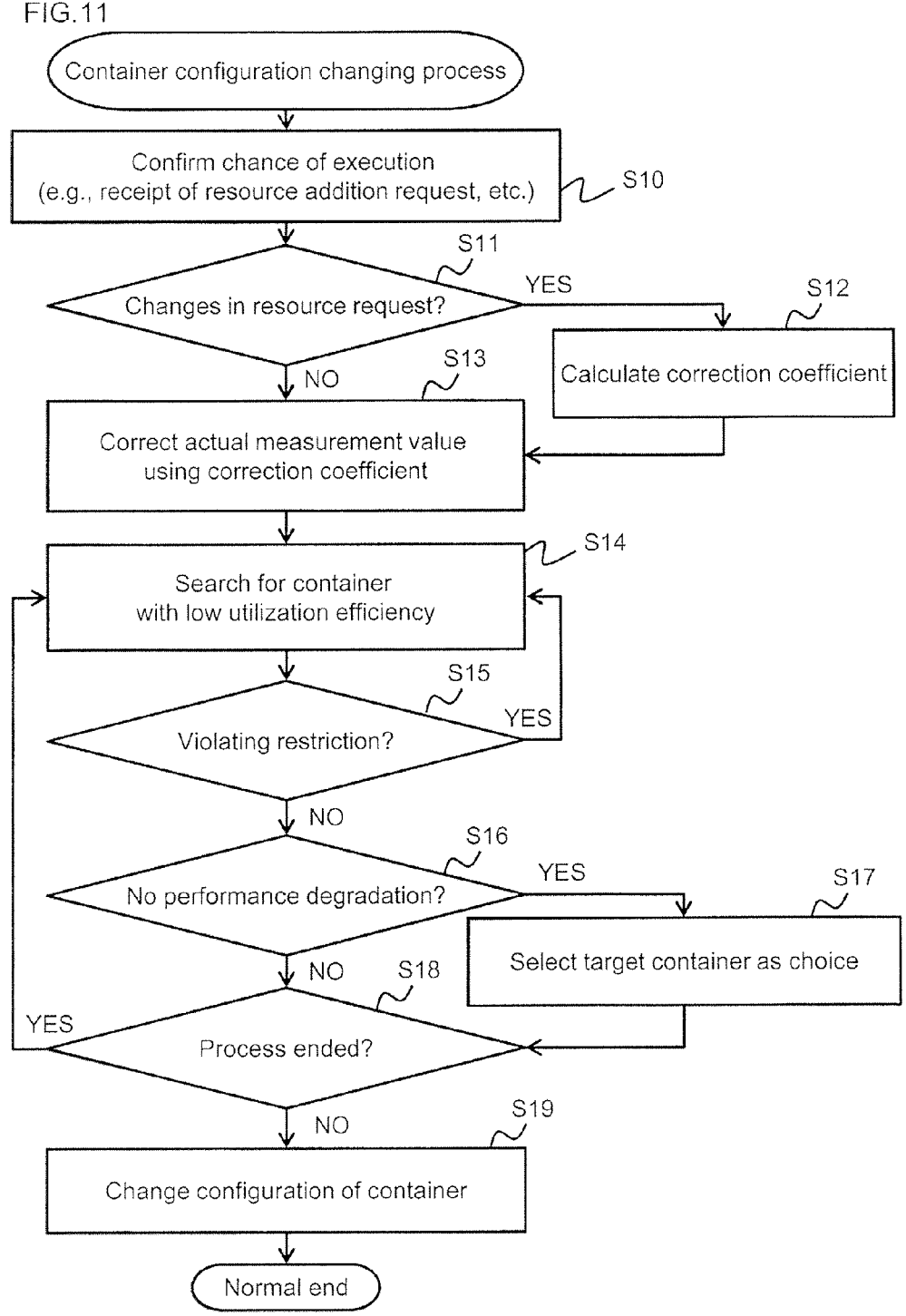
FIG. 11 is a flowchart showing a process for changing the configurations of the containers in response to a request from a tenant.

FIG. 11 is a flowchart showing a process for correcting the operation information of each container based on the resource requirements requested by the applications, calculating the operation information of all the resources, and determining a container that lends a resource.

When the resource configuration management unit 213 receives a resource addition request from, for example, the application management server 201 (S10), this receipt of the request leads to the beginning of the following process. The resource addition request includes the type of the application 12 (or 22). The resource addition request might further include the amount of resources to be added. This receipt of the resource addition request is not the only certain opportunity that sets off a series of processes for changing the configurations of the containers 310 and thereby changing the resource distributions. The processes may also be started when, for example, the system manager explicitly indicates to do so. The integrated management unit 202 may execute the processes on a regular basis. When the user request management unit 210 receives a request for changing the configuration of an instance, the application management server 211k may be specified from the instance management table 211, and then the processes may be executed.

Moreover, there exist a plurality of methods for determining what type of resource (a server, a network, a storage) is to be added. For example, the user may clearly specify the type of a required resource and indicate a resource addition request. The types and amount of resources that need to be added may automatically be specified by automatically calculating them based on the histories of the resource utilization rates.

As this automatic calculation, there exists a method for using the resource request definition table 207 or application operation information table 208 of the application management server 201 to calculate the consumption trends of the resources and determine a resource showing a significant consumption trend as a target to be added. Another method may be a method of determining, as the resources to be added, the resources with high correction coefficients 214d in the performance evaluation table 214 of the integrated resource management unit 202.

In step S11, the integrated resource management unit 202 determines whether there are changes in the resource requirements defined in the application management servers 201. Specifically, the resource configuration management unit 213 determines the presence/absence of an update with reference to the resource requirement definition table 207 via the resource management unit 206 on the application management server 201. When there is an update as a result of the determination (S11: YES), the resource configuration management unit 213 calculates the correction coefficients 214d again in step S12 and updates the performance evaluation table 214 to the latest version.

In step S13, the resource configuration management unit 213 acquires the actual measurement values 214c corresponding to the operation information from the resource operation information database 216, calculates the correction values 214e, and stores the calculated correction values in the performance evaluation table 214.

In step S14, the resource configuration management unit 213 starts a process for sequentially searching the records described in the container management table 215 and detecting a container having a low resource utilization rate. In the performance evaluation table 214, as the container with a low resource utilization rate, the one with a low total correction value is selected and determined by calculating the sum of the correction values 214e associated with the positive influence determination (+).

In step S15, with reference to the application restrictions 215h of the container management table 215, the resource configuration management unit 213 determines whether or not the application requesting for an additional resource can be operated on the container to be processed. When it is determined that the container to be processed violates the application restrictions 215h (S15: YES), the resource configuration management unit 213 returns to step S14 to select another container with a low total correction value 214e, as the container to be processed.

In step S16, with reference to the influence determination 214f of the performance evaluation table 214, the resource configuration management unit 213 determines whether there is performance degradation exceeding a predetermined performance degradation reference value.

Examples of the method for determining the presence/absence of performance degradation include a method based on a threshold and a method for comparing the degrees of negative performance influences 214f between a candidate container that is already selected and the container to be processed. When the degree of negative performance influence 214f of the container to be processed is greater than the value 214f corresponding to the candidate container, it may be determined that there is performance degradation.

When there is no performance degradation (S16: YES), the resource configuration management unit 213 selects, in step S17, this container to be processed as a candidate container that is subjected to resource configuration review. Not only one container is selected as a candidate, but in some cases a plurality of containers are selected as candidates. Note that the candidate containers may be selected in consideration of the container types 215f shown in FIG. 7.

In step S18, the resource configuration management unit 213 determines whether there exists an unprocessed container among the containers described in the container management table 215. When there exists an unprocessed container (S18: YES), the resource configuration management unit 213 returns to step S14, and repeats the steps described above.

When there are no more unprocessed containers (S18: NO), and when one or more candidate containers are deleted, in step S19 the resource configuration management unit 213 changes the resource configurations of these candidate containers.

Changing the resource configurations of the candidate containers typically means reducing the resources. Examples of a process for reducing the resource configurations of the containers in step S19 include a process for deleting one or more nodes (physical servers) from the server cluster, a process for reducing the volumes from the storage resource, and a process for lowering the communication priority configured in the network resource. Alternatively, in step S19, a process for gathering the instances in the other containers managed by the same application management server 201 may be executed. Step S19 may execute a process for creating a new container that has a smaller resource capacity than the candidate containers, and then delivering the instances operated on the candidate containers and the identification information of the candidate containers to the newly created small container.

However, for all processing details in step S19 described above, the identification information and instances of the candidate containers are not deleted, and the records in the container management table 215 are updated to appropriate values by the resource configuration management unit 213. More specifically, for example, in step S19, when a node is deleted from the server cluster of a migration-source container and when a virtual server is operated on this node, the virtual server is migrated to another node in the same server cluster and remains in the migration-source container. At this moment, there are no changes in the instance management table 211 or the virtual resource capacities j of the container management table 215. Consequently, the user using the migration-source container and the application management server 201 can continue to use the migration-source container without knowing the changes of the physical configurations made in step 19. Meanwhile, the identifier of the node is deleted from the server field 215d of the container management table 215 that corresponds to the record managing the migration-source container, and the amount of resources that the node had is subtracted from the actual resource capacity k field.

In addition, in step S19, the excess resources that are generated in the process for reducing the candidate containers are migrated to the container that is requested to add a resource in step S10. In so doing, the resource configuration management unit 213 updates the records in the container management table 215 to appropriate values, as with the migration-source container. However, when updating the records of the container management table 215 that corresponds to the migration-destination container that is requested to add a resource, the identifier of any of the apparatuses is added, then the actual resource capacity k field is updated, and the capacity of the added resource is added to the virtual resource capacity j.

In the process for migrating a resource from the migration-source container to the migration-destination container, a process for increasing the number of resources configuring the migration-destination container is executed in the migration-destination container. Subsequently, a process for smoothening the load in the same container, such as a process for rearranging the virtual machines in the virtual machine host cluster, may be performed.

<Method for Managing Access Information on Physical Apparatuses>

When the application management server 201 manages the container 310, the physical apparatuses need to be accessed. The application management server 201 accesses the physical apparatuses by using access information. A management IP address, a verified account, and an apparatus ID, for example, can be used as the access information.

The application management server 201 can change the resource configuration of the container 310 safely and reliably by using appropriate access information. The change in configuration here means, for example, a change in the power status, a change in BIOS (Basic Input/Output System) configuration value such as a boot option, a change in configuration of a network adapter such as a physical address, switching an input/output device, and the like.

On the other hand, because the OSs on the physical apparatuses are used in a virtual server environment or other server environments that do not require the tenant management, it was possible to create as much new access information as possible by reconfiguring or reinstalling the OSs.

However, when using a non-virtualized server environment by transferring the authority for each of a plurality of applications, the access information based on the physical apparatuses need to be released. As a method for controlling the access from the application management server 201 and each physical apparatus, there is a method for changing the verified account of the host kept by the application management server 201 or changing the access route in the firewall 303 on the management network.

In step S19 of the process shown in FIG. 11 described above, when the container 310 is configured by a single physical apparatus (e.g., when using the bare metal host 10), the same physical apparatus needs to be re-registered into the container corresponding to the application management server. For this reason, the access information needs to be migrated from the migration-source application management server to the migration-destination application management server.

Migration of the access information here does not mean that the access information used in the migration source can be used in the migration destination as well, but means that the access information is configured in the migration-destination application management server so that the migration-destination application management server can safely use the migration-destination container.

In a case where the access information on the migration-target physical apparatus is not migrated to the migration-destination application management server, the migration-source application management server that has been using this physical apparatus can access the migrated physical apparatus as usual. Consequently, unauthorized access, system failure, data loss and the like take place. Because the physical apparatus are lent among the plurality of containers according to the present example, it is crucial to properly migrate the access information.

FIG. 12 is a flowchart showing a process for migrating the access information. In the following description, the access information is often referred to as "access authority information."

In step S30, the resource configuration management unit 213 invalidates the access authority configured in the migration-target physical apparatus and used by the migration-source application management server 201. The access authority is not deleted completely here so that the valid access authority is not lost even in case of occurrence of an unexpected failure in the subsequent processes.

In step S31, the resource configuration management unit 213 requests the resource management unit 206 of the migration-source application management server 201 to delete the access authority corresponding to the migration-target physical apparatus. When the migration-source application management server 201 does not provide an access authority changing function, the firewall 303 on the management network may block the access route between the migration-source application management server 201 and the migration-target physical apparatus.

In step S32, the resource configuration management unit 213 creates new access authority on the migration-target physical apparatus through the server management unit 203, and validates the access authority.

In step S33, the resource configuration management unit 213 notifies the migration-destination application management server 201 of the new access authority created in step S32, and enables future use of the new access authority.

However, when the migration-destination application management server 201 does not provide the access authority changing function, the access route from the migration-destination application management server 201 to the migration-target physical apparatus may be enabled in the firewall 303 of the management network.

In step S34, the resource configuration management unit 213 confirms that the appropriate migration of the access authority. When confirming the migration, for example, the connections from the migration-source application management server and the migration-destination application management server 201 to the migration-target physical apparatus are tested. If the migration of the access authority fails as a result of the connection test (S34: NO), the resource configuration management unit 213 proceeds to step S36 to reset the state of the present flowchart to the state of the starting point, and terminates this process with error.

When the access authority is migrated normally (S34: YES), in step S35 the resource configuration management unit 213 deletes the old access authority from the migration-target physical apparatus, the old access authority being invalidated once in step S30, and normally ends this process. As a result, the migration-source application management server 201 cannot access the migrated physical apparatus permanently, and the safety is maintained.

According to the present example, the resources can be dynamically be migrated between the containers in response to a change in the usage statuses of the resources, improving the resource usage efficiency.

According to the present example, in the data center where the demands constantly change, the utilization efficiency of the entire resources can be optimized without contradicting the resource management system or application management system of each tenant.

In addition, according to the present example, the know-how for application management that was cultivated in the conventional operation can continuously be utilized, while ensuring security of each tenant.

In the present embodiment, the amount of resources that are allocated to the application programs beforehand is sometimes configured to be lower than the usage designated by a resource addition request, but additional resources can be allocated anytime in accordance with the subsequent usage status, and the computer system can efficiently be operated with the small number of resources. Note that such expression as "the amount of resources is sometimes configured to be lower than the designated usage" may be rephrased as "the amount of resources is configured to be lower than the designated usage."

The present invention is not limited to the examples described above. A person skilled in the art can provide various additions and modifications within the scope of the present invention. For example, the technical features of the present invention described above can appropriately be combined and implemented.

REFERENCE SIGNS LIST 10, 20 Host
11, 21 Instance
50, 60 Switch
70 Client computer
100 Storage apparatus
200 Management computer
201 Application management server
202 Integrated resource management unit
203 Server management unit
204 Network management unit
205 Storage managSERVERSement unit

The invention claimed is:

1. A resource management system managing resources, comprising:
   a plurality of physical computers configured to provide the resources;
   a plurality of virtual computers configured to execute at least one of application programs; and
   an integrated resource management unit that is coupled communicably to the plurality of physical computers and the plurality of virtual computers, wherein the integrated resource management unit is configured to:
      prepare a plurality of containers for managing some of the resources associated therewith and providing these resources as virtual resources; and
      manage a resource division that defines a use range of the provided virtual resources,
      the plurality of containers are configured to be associated with any of the application programs, and, upon receipt of a resource configuration change request regarding an application program operated in the resource division, migrate the resources managed by the other containers to the containers associated with the application program, and
      the amount of resources managed by the other containers is occasionally lower than the amount of virtual resources provided by the other containers,
   wherein the integrated resource management unit associates a first predetermined resource, which is part of the resources associated with a first container provided to a first resource division of a plurality of resource divisions, with a second container that is provided to a second resource division of the plurality of resource divisions, and thereby migrates from the first resource division to which the first predetermined resource belongs, to the second resource division,
   wherein the integrated resource management unit manages utilization rates of a plurality of resources used by the application programs, and selects a resource exhibiting a lowest utilization rate as the first predetermined resource from among the plurality of resources, and
   wherein the integrated resource management unit manages performance degradation of each of the plurality of resources, and, when the performance degradation of the resource with the lowest utilization rate is lower than a predetermined value, selects, as the first predetermined resource, a resource that has the lowest utilization rate and performance degradation lower than the predetermined value.

2. The resource management system according to claim 1, wherein the integrated resource management unit determines whether the first predetermined resource satisfies a predetermined restriction condition used by a second application program, and selects, as the first predetermined resource, a resource that has the lowest utilization rate and performance degradation lower than the predetermined value and satisfies the predetermined restriction condition.

3. The resource management system according to claim 2, wherein
   the integrated resource management unit
   is coupled communicably to a first application management unit for managing a first application program that uses the first container, and to a second application management unit for managing a second application program that uses the second container,
   invalidates old access authority information that is configured in the first predetermined resource and used by the first application management unit to access the first predetermined resource, when migrating the first predetermined resource from the first container to the second container,
   deletes the old access authority information from the first application management unit,
   generates new access authority information and configures the new access authority information in the first predetermined resource,
   configures the new access authority information in the second application management unit,
   confirms that access authority for enabling access to the first predetermined resource is migrated from the first application management unit to the second application management unit, and
   deletes the old access authority information from the first application management unit.

4. The resource management system according to claim 1, wherein the integrated resource management unit executes predetermined computation using an actual value of a predetermined performance index that is configured in advance for each of the resources associated with the plurality of containers, thereby calculates a performance evaluation value for evaluating performance of each of the plurality of containers without relying on types of the application programs that use the containers, and presents the calculated performance evaluation values.

5. The resource management system according to claim 1, wherein
   the integrated resource management unit executes predetermined computation using an actual value of a predetermined performance index that is configured in advance for each of the resources associated with the plurality of containers, thereby calculates a performance evaluation value for evaluating performance of each of the plurality of containers without relying on types of the application programs that use the containers, and notifies an apparatus issuing the predetermined request of the calculated performance evaluation values,
   the predetermined request being a request for addition of the resources which are determined to be bottlenecks, based on the performance evaluation values.

6. The resource management system according to claim 1, wherein the integrated resource management unit executes predetermined computation using an actual value of a predetermined performance index that is configured in advance for each of the resources associated with the plurality of containers, thereby calculates a performance evaluation value for evaluating performance of each of the plurality of containers without relying on types of the application programs that use the containers, manages performance degradation of each of the plurality of containers based on the calculated performance evaluation values, and when the performance degradation of the container having the lowest utilization rate is lower than a predetermined value, selects, as the first predetermined resource, a resource that has the lowest utilization rate and performance degradation lower than the predetermined value.

7. A resource management method for managing resources of an information processing system by using a management computer, wherein the information processing system is configured to have a plurality of physical computers that provide the resources, a plurality of virtual computers that execute at least one of application programs, and the management computer that is coupled communicably to the plurality of physical computers and the plurality of virtual computers, the management computer is configured to prepare a plurality of containers for managing some of the resources associated therewith and providing these resources as virtual resources, and to manage a resource division that defines a use range of the provided virtual resources, the plurality of containers are configured to be associated with any of the application programs, and upon receipt of a resource configuration change request regarding an application program operated in the resource division, migrate the resources managed by the other containers to the containers associated with the application program, and the amount of resources managed by the other containers is occasionally lower than the amount of virtual resources provided by the other containers, wherein the management computer associates a first predetermined resource, which is part of the resources associated with a first container provided to a first resource division of a plurality of resource divisions, with a second container that is provided to a second resource division of the plurality of resource divisions, and thereby migrate a from the first resource division to which the first predetermined resource belongs, to the second resource division, wherein the integrated resource management unit manages utilization rates of a plurality of resources used by the application programs, and selects a resource exhibiting a lowest utilization rate as the first predetermined resource from among the plurality of resources, and wherein the integrated resource management unit manages performance degradation of each of the plurality of resources, and, when the performance degradation of the resource with the lowest utilization rate is lower than a predetermined value, selects, as the first predetermined resource, a resource that has the lowest utilization rate and performance degradation lower than the predetermined value.

8. A non-transitory storage media storing a computer program, the computer program causing a computer to function as a management computer for managing resources of an information processing system, wherein the information processing system is configured to have a plurality of physical computers that provide the resources, a plurality of virtual computers that execute at least one of application programs, and the management computer that is coupled communicably to the plurality of physical computers and the plurality of virtual computers, the management computer is caused to prepare a plurality of containers for managing some of the resources associated therewith and providing these resources as virtual resources, and manage a resource division that defines a use range of the provided virtual resources, the plurality of containers are configured to be associated with any of the application programs, and upon receipt of a resource configuration change request regarding an application program operated in the resource division, migrate the resources managed by the other containers to the containers associated with the application program, and the amount of resources managed by the other containers is occasionally lower than the amount of virtual resources provided by the other containers, wherein the computer program causes the computer to associate a first predetermined resource, which is part of the resources associated with a first container provided to a first resource division of a plurality of resource divisions, with a second container that is provided to a second resource division of the plurality of resource divisions, and thereby migrate a from the first resource division to which the first predetermined resource belongs, to the second virtual resource, wherein the computer program causes the computer to manage utilization rates of a plurality of resources used by the application programs, and selects a resource exhibiting a lowest utilization rate as the first predetermined resource from among the plurality of resources, and wherein the computer program causes the computer to manage performance degradation of each of the plurality of resources, and, when the performance degradation of the resource with the lowest utilization rate is lower than a predetermined value, selects, as the first predetermined resource, a resource that has the lowest utilization rate and performance degradation lower than the predetermined value.

* * * * *